Jan. 11, 1949.  C. W. GOFF  2,458,848
HITCH MECHANISM
Filed Nov. 26, 1945  2 Sheets-Sheet 1

INVENTOR
CLARENCE W. GOFF
BY Merrill M. Blackburn
ATTORNEY

Jan. 11, 1949.  C. W. GOFF  2,458,848
HITCH MECHANISM

Filed Nov. 26, 1945  2 Sheets-Sheet 2

INVENTOR
CLARENCE W. GOFF
BY Merrill M. Blackburn.
ATTORNEY

Patented Jan. 11, 1949

2,458,848

UNITED STATES PATENT OFFICE 2,458,848

HITCH MECHANISM

Clarence W. Goff, Washington, Iowa

Application November 26, 1945, Serial No. 630,824

1 Claim. (Cl. 280—33.15)

My present invention relates to mechanism for making easy the connection and disconnection of a tractor unit with a drawn unit and comprises among its objects the provision of a hitch mechanism such that a tractor equipped therewith may be backed up to a unit to which it is to be connected and easily and automatically connected thereto with the least trouble on the part of the operator; the provision of a structure for the purpose indicated which is so constructed that the driver of the tractor unit may, merely by pulling on a cord or chain, unlatch the hitch unit from the drawn unit with the least delay possible; and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as the preferred embodiment of this invention and a modification thereof, I desire the same to be understood as illustrative only and not to be interpreted in a limiting sense.

In the drawings annexed hereto and forming a part hereof,

Figure 1:
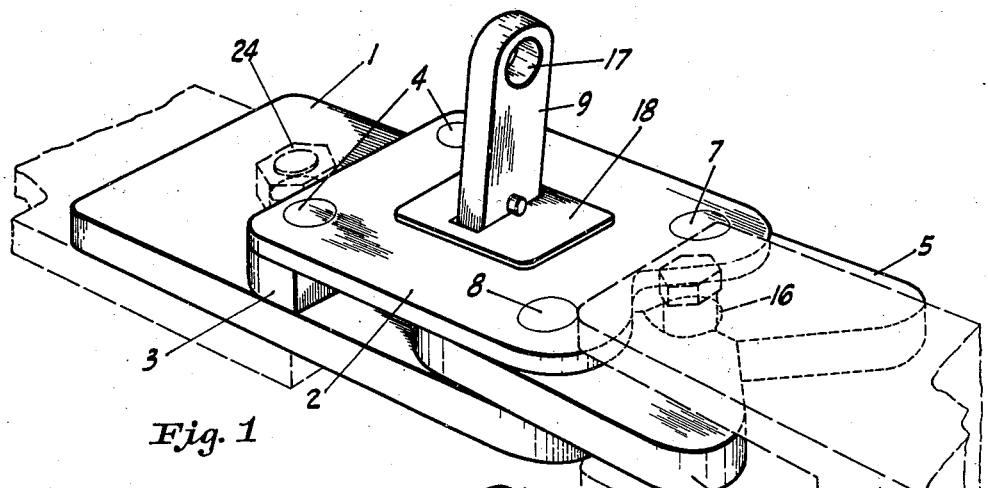
Fig. 1 represents a perspective view of one form of my construction with the jaws closed.
Figure 2:
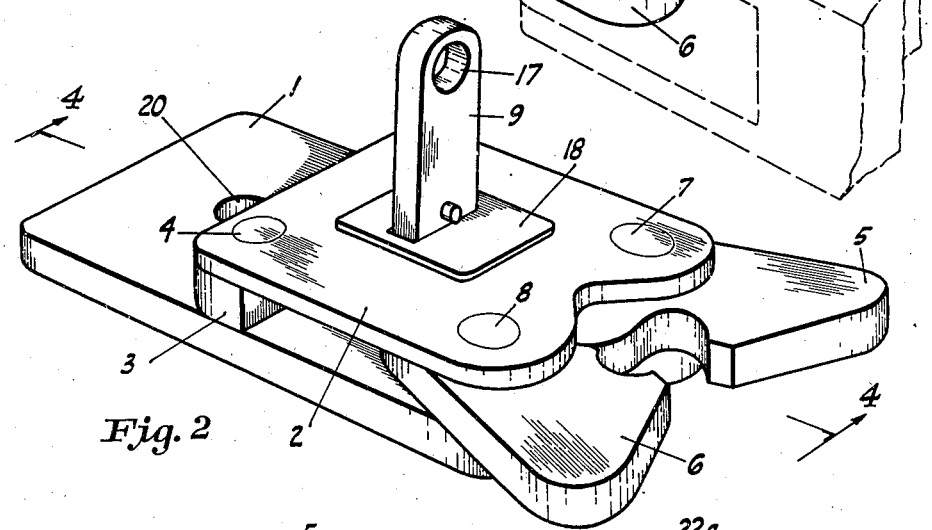
Fig. 2 represents a perspective view of the structure shown in Fig. 1 with the jaws open.

Reference will now be made in greater detail to the annexed drawings for a more complete description of this invention. Specifically, this construction comprises a pair of body members 1 and 2 held in spaced relation by a spacing block 3, and the three parts are held in assembled relation by a plurality of securing members 4, shown as rivets. A pair of jaws 5 and 6 are pivotally mounted between the body members 1 and 2 on pivot members 7 and 8, shown as rivets. A latching member 9 is pivotally connected at its lower end by a pivot member 10 to a pair of lugs 11 projecting downwardly from the bottom of the body member 1. This latching member is spring actuated by a spring 12 which forces it into the space 13 between the rear ends of the jaws 5 and 6 when these jaws are closed. At one end, the spring 12 bears against the bar 3 and, at its opposite end, against the latch member 9. The spring, being under compression, forces the latch member 9 between the rear ends 14 of the jaws 5 and 6, when the paws are closed, to hold them in closed position. The forward end portions of the jaws are provided with notches 15 which, when the jaws are closed, constitute the hitch pin hole 16.

Figure 5:
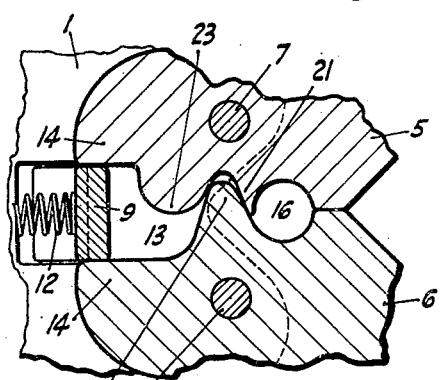
Fig. 5 represents a fragmentary horizontal section of the rear portion of the jaws of this device in closed position.
Figure 6:
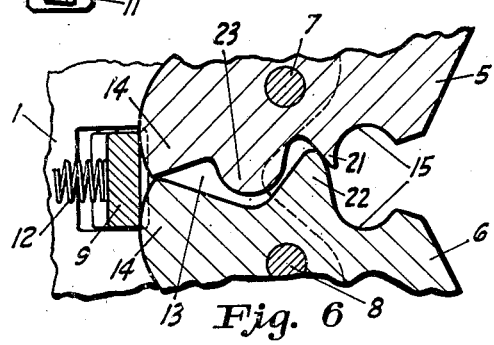
Fig. 6 represents a view similar to that of Fig. 5 with the jaws in open position, the same being taken substantially along the plane indicated by the line 6—6, Fig. 4.

The upper end of the latch member 9 is provided with an opening 17 for the attachment of a cord, cable, chain, or the like, whereby the latch may be turned to unlatching position when it is desired to unhitch the traction unit from the drawn unit. The latch member 9 passes through an opening in the cover plate 18 which slides on top of the body member 2 and covers up the opening 19 therein. The rear end portion of the body member 1 is provided with an opening 20 for the reception of the hitch pin 24 of the traction unit, thus providing for the connection of this hitch mechanism to the tractor. The jaws 5 and 6 are provided on their adjacent edges with fingers 21, 22, and 23 which form interengaging members to cause the jaws to work in unison. Also, the fingers 21 and 22 are engaged by the hitch pin of the drawn unit when the hitch mechanism is backed into a position to cause hitching. When these fingers 21 and 22 engage the hitch pin, they are pushed forwardly thereby, resulting in the jaws 5 and 6 being closed, which permits the latch member 9 to enter between the ends 14 of the jaws 5 and 6, as shown in Fig. 5, thus latching these jaws against being opened by a forward pull of the traction unit.

Figure 7:
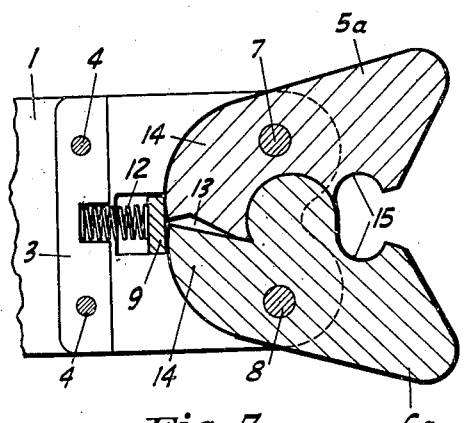
Fig. 7 represents a horizontal section of a modified form of this construction with the jaws in open position.
Figure 8:
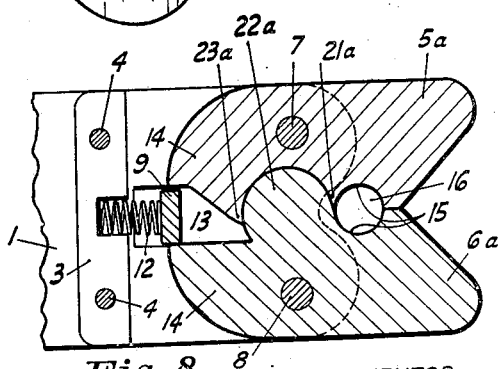
Fig. 8 represents a similar section of the structure shown in Fig. 7 with the jaws in closed position.
Figure 3:
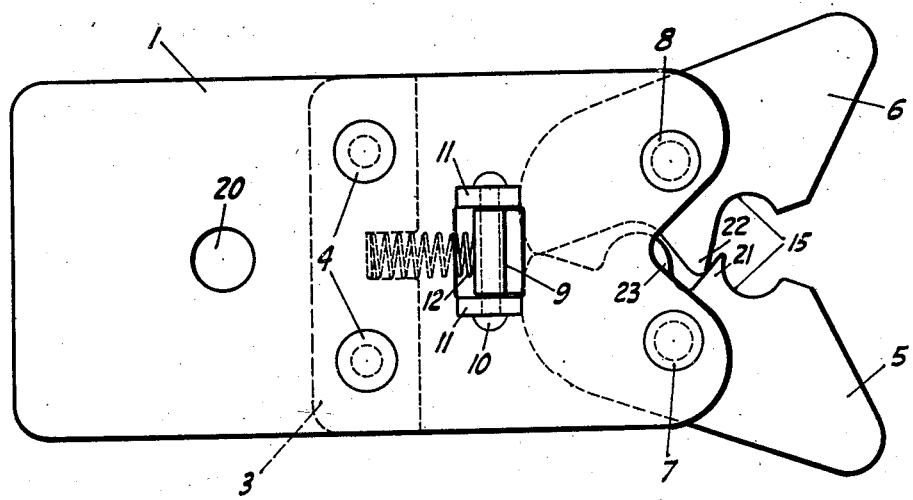
Fig. 3 represents a view similar to Fig. 2, taken in the opposite direction.
Figure 4:
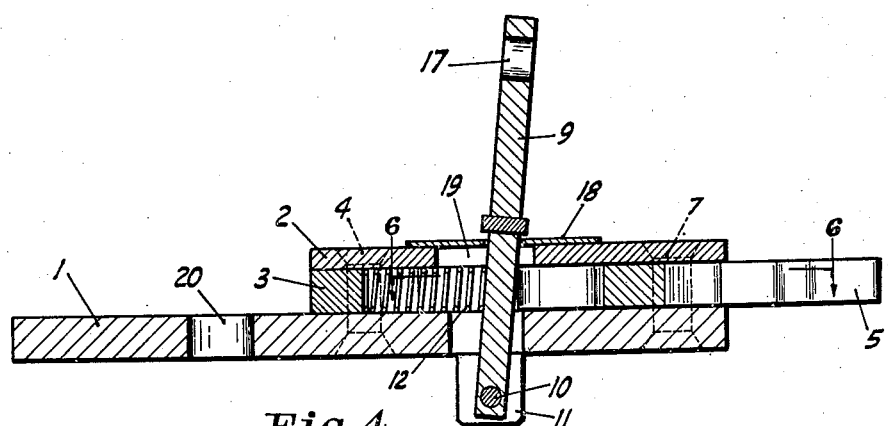
Fig. 4 represents a longitudinal section taken substantially along the plane indicated by the line 4—4, Fig. 2.

In the structure shown in Figs. 7 and 8, the jaws 5a and 6a differ somewhat in form from the corresponding members 5 and 6 referred to above. Also, the fingers 21a, 22a, and 23a, corresponding to fingers 21, 22, and 23, are shaped somewhat differently from the corresponding fingers but function in the same way and produce the same result.

It will of course be understood that the specific description of structure set forth above may be departed from without departing from the spirit of this invention as disclosed herein and defined in the appended claim.

Having now described my invention, I claim:

In a hitch mechanism, a supporting body having spaced upper and lower body members and a pair of laterally separated pivots connecting the body members, a pair of jaws mounted on said pivots and extending forwardly and rearwardly therefrom, said jaws being adapted to be opened and closed and, when closed, engaging each other with a hole between them opening upwardly and downwardly, only, for the reception of a hitch pin, the rearwardly extending parts of the jaws, when the jaws are closed, being spaced and adapted to receive between them a latching member, and a pivoted latching member carried by the lower body member and adapted to swing into and out of the space between the rearwardly extending parts of the jaws when they are closed and, when swung into position between the jaws, serving to hold the jaws closed, the latching member being a lever pivotally suspended from the lower face of the lower body member and spring-urged into latching position between the rearwardly extending parts of the jaws, said body members being slotted to allow the latching member to extend transversely through both body members and to swing about its pivot into and out of latching position.

CLARENCE W. GOFF.

REFERENCES CITED

The following references are of record in the file of this patent:

UNITED STATES PATENTS

| Number | Name | Date |
| --- | --- | --- |
| 776,292 | Buller | Nov. 29, 1904 |
| 1,233,849 | Culhane | July 17, 1917 |
| 1,240,818 | Buller | Sept. 25, 1917 |
| 1,451,658 | Hennekin | Apr. 10, 1923 |
| 2,347,033 | Daton | Apr. 18, 1944 |